US005489845A

United States Patent [19]
Weber et al.

[11] Patent Number: 5,489,845
[45] Date of Patent: Feb. 6, 1996

[54] ENCODER SYSTEM AND METHOD FOR DETERMINING ABSOLUTE ROTOR POSITION BY TAKING A MID VALUE OF THE MULTIPLE COIL OUTPUT SINUSOIDAL SIGNALS

[75] Inventors: Charles F. Weber, South Lyon; Kah S. Oo, Farmington Hills; Rodolfo Palma, Canton, all of Mich.

[73] Assignee: Ford Motor Company, Dearborn, Mich.

[21] Appl. No.: 308,790

[22] Filed: Sep. 19, 1994

[51] Int. Cl.[6] .................. G01B 7/30; G01B 7/14
[52] U.S. Cl. .................. 324/207.25; 324/207.16
[58] Field of Search .................. 324/207.25, 207.24, 324/207.23, 207.22, 207.15, 166, 173, 202; 364/565; 318/652, 653, 661; 310/168; 341/15

[56] References Cited

U.S. PATENT DOCUMENTS

| | | | |
|---|---|---|---|
| 4,461,994 | 7/1984 | MacDonald | 324/174 |
| 4,712,186 | 12/1987 | Fromme | 364/565 |
| 4,991,301 | 2/1991 | Hore | 324/207.25 |
| 5,107,213 | 4/1992 | Ponticelli et al. | 324/207.25 |

Primary Examiner—Sandra L. O'Shea
Assistant Examiner—Roger Phillips
Attorney, Agent, or Firm—Peter Abolins; Roger L. May

[57] ABSTRACT

A method and system for determining absolute rotor position with a Variable Reluctance (VR) motor. An inductance sensor is compatible with the VR motor and is adapted to generate a plurality of variable inductance values corresponding to the position of the rotor. The inductance values may be plotted during calibration as phase-separated pseudo-sinusoidal waveforms with a resultant inductance/position profile having near-linear regions with determinable slopes and offsets. Excitation electronics converts variable inductance values to corresponding digital values which are suitable for computer processing. A micro computer is adapted to determine which of the digital values is a mid-value and to convert the mid-value to high resolution motor rotor angular units in accordance with the calibration-determined slopes and offsets.

12 Claims, 6 Drawing Sheets

ENCODER SYSTEM AND METHOD FOR DETERMINING ABSOLUTE ROTOR POSITION BY TAKING A MID VALUE OF THE MULTIPLE COIL OUTPUT SINUSOIDAL SIGNALS

TECHNICAL FIELD

This invention relates generally to high resolution position encoding. More particularly, the invention relates to a system and method for determining absolute rotor position by reference to the changing reluctance in an inductance sensor. The invention is particularly suited for use with a Variable Reluctance (VR) motor for making fine adjustments such as, for example, in an electronic throttle control system.

BACKGROUND ART

In an effort to produce automobiles which are lighter and more efficient, automotive designers continue to seek ways to utilize smaller displacement engines without noticeable, if any, sacrifice in power. Typically, this feat has been accomplished through the use of a large throttle body to force an increased volume of air through the engine so as to accordingly increase the power output.

The problem encountered by this approach, however, is that it is exceedingly difficult to control idle on small displacement engines which are very sensitive on the throttle plate. This problem has been addressed by those skilled in the art through the use of air by-pass valves which are separate pieces of hardware used for fine tuning. As its name explains, the air by-pass valve literally by-passes the throttle plate to allow the engine to be more easily controlled at idle. As readily seen, this prior art approach inherently introduces a new component which increases the manufacturing and labor costs of the vehicle and, which ultimately, must be passed on to the consumer.

Consequently, a need has developed for a system and method for making fine adjustments to an automobile engine—particularly at the idle range— without the introduction of additional hardware. Such a system and method should be particularly suited to measuring throttle position for an electronic throttle control system so as to control air, fuel, spark, etc. Such a system should not require the use of additional hardware or contacting elements which will add additional expense or wear out.

DISCLOSURE OF THE INVENTION

It is an object of the present invention to provide a system and method for measuring throttle position in an electronic throttle control system.

It is a further object of the present invention to provide an angular encoder system and method which are directed for use with a Variable Reluctance (VR) motor for determining absolute rotor position.

In accordance with the above-stated objects and other objects, features and advantages of the present invention, there is provided an angular encoder system for determining absolute rotor position. The encoder system is specifically desired for use with a Variable Reluctance (VR) motor as referenced above, and includes an inductance sensor which is compatible with the VR motor and adapted to generate a plurality of variable inductance values. These values correspond to the position of the rotor and, in a calibration stage, may be plotted as phase-separated pseudo- sinusoidal waveforms. The resultant inductance/position profile has near-linear, i.e., sawtooth-like, regions with slopes and offsets which may be determined and stored in memory. Excitation electronics is further provided in electrical communication with the inductance sensor for converting the variable inductance values to corresponding digital values which are suitable for computer processing. Finally, a microcomputer having memory is provided in electrical communication with the excitation electronics. The microcomputer is adapted to determine which of the digital values is a mid-value and to further convert the mid-value to high resolution motor rotor angular units. The conversion step is made in accordance with the slopes and offsets stored in the microcomputer during the calibration stage.

In a preferred embodiment, the inductance sensor of the angular encoder system comprises a stationary arrangement of stationary coils which form a stator and a magnetic salient pole rotating structure which forms a rotor and is free to turn inside or outside of the stator. In this preferred embodiment, the stator has six salient poles each having a multi-turn winding which is electrically connected and powered such that a magnetic flux path closes around any two adjacent stator poles. The rotor has eight salient poles. Also in the preferred embodiment, the stator poles are arranged in three-phased windings distributed in the above-referenced six windings with two coils connected in series in each phase so as to generate three phase-separated variable inductance values for each rotor position.

Still further, in the preferred embodiment, the excitation electronics comprises a corresponding plurality of powered encoder coils as well as a plurality of switches. Each of the switches are provided in electrical communication with one another and a corresponding encoder coil. A plurality of current sensors is similarly provided, each of which is in electrical communication with a corresponding switch and is further adapted to convert current to voltage. Still further, a free running oscillator/clock is provided along with a digital counter. The digital counter is electrically connected to the oscillator/clock and the microcomputer. A plurality of comparators are also provided each of which has a first input from a corresponding current sensor and a second input from a reference voltage source, and an output. Finally, a plurality of memory latches are provided each of which is in electrical communication with one another, the digital counter, the microcomputer and the output of a corresponding comparator. In operation, the memory latches are operative to latch the value of the digital counter when the voltage input from a corresponding current sensor exceeds the reference voltage at the corresponding comparator.

Also in accordance with the present invention, a method for determining absolute rotor position is disclosed which is also particularly suited for use with a Variable Reluctance (VR) motor. The method includes the steps of providing a microcomputer having memory as well as providing an inductance sensor compatible with the VR motor. The inductance sensor is adapted to generate a plurality of variable inductance values corresponding to the position of the rotor. By plotting an inductance/position profile of the variable inductance values, a plurality of phase-separated pseudo-sinusoidal waveforms may be obtained each having near linear regions with determinable slopes and offsets. The slopes and offsets may be determined at the near linear range, i.e., sawtooth, regions with the values stored in microcomputer memory. Thereafter, the variable inductance values are converted to corresponding digital values suitable for computer processing. Finally, the mid-value of the digital values is determined and converted to high resolution motor rotor angular units in accordance with the stored slopes and offsets.

In the preferred embodiment, the step of converting the digital values to high resolution motor rotor units is accomplished in accordance with the formula:

$PR = mi * Lm + Ci$, where:

$mi$ = slope;

$ci$ = offset;

$Lm$ = the mid-value of the plotted inductance values;

$P$ = total rotor position = $PH + PR$;

$PH$ = high ordinance position values; and $PR$ = low ordinance position value.

These and other objects, features and advantages of the present invention are readily apparent from the following detailed description of the best mode for carrying out the invention when taken in connection with the accompanying drawings wherein like reference numerals correspond to like components.

BEST MODES FOR CARRYING OUT THE INVENTION

Figure 1:
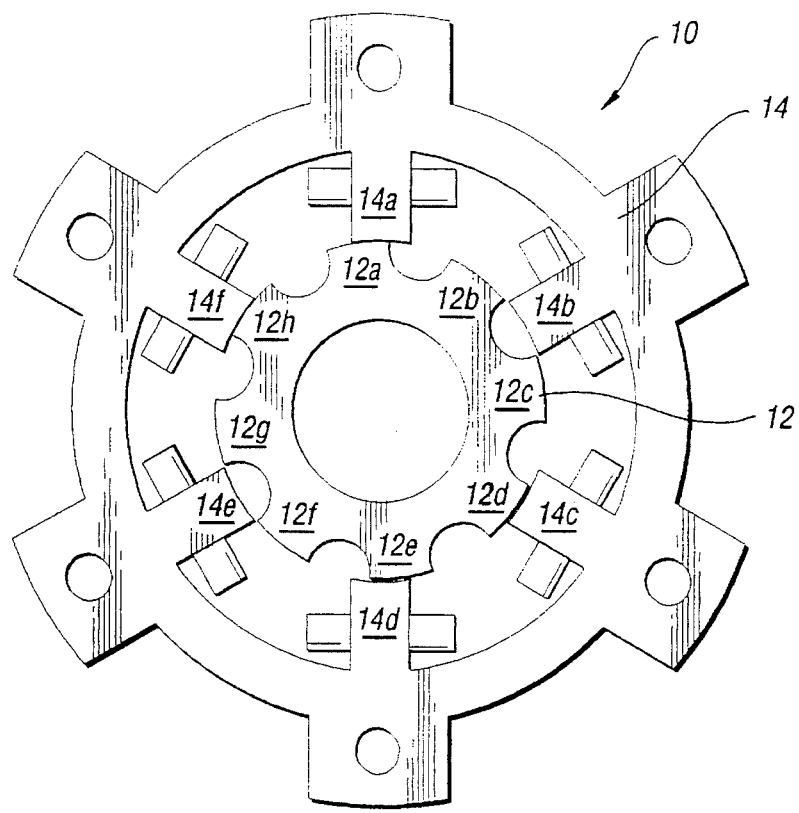
FIG. 1 is a schematic diagram of a cross-section of an inductance sensor used in accordance with the present invention.

FIG. 1 of the present invention illustrates a schematic diagram of a cross-section of an inductance sensor used in accordance with the teachings of the present invention and designated generally by reference numeral 10. Sensor 10 consists of a magnetic salient pole rotating structure, i.e., a rotor 12 which is free to turn inside or outside of a stationary arrangement of stationary coils forming the stator 14. As seen, the number of poles in the rotor structure 12 is not the same as the number of poles in the stator structure 14. As a result, the combination produces a vernier effect.

Typical rotor-stator pole combinations are 8-6, 4-6, 8-12, etc. Sensor 10 is particularly suited for use with a Variable Reluctance (VR) motor and may physically be placed on back of the VR motor and share the same rotor shaft.

To enhance the magnetic detection of position and to reduce the detection currents, the stator coils may be wound around a salient pole magnetic structure, i.e., the stator core, as shown. In a preferred embodiment shown in FIG. 1, the rotor 12 is inside of the stator 14 and the stator has six salient poles 14a–14f and the rotor has eight salient poles 12a–12h. Both the magnetic rotor 12 and the stator 14 are made of electrical steel to minimize eddy currents that might adversely affect the position detection. Typical means of obtaining this are through the use of thin steel laminations, i.e., nickel-steel alloys or other means to increase the magnetic material electric resistivity and reduce the hysterisis losses.

Figure 2:
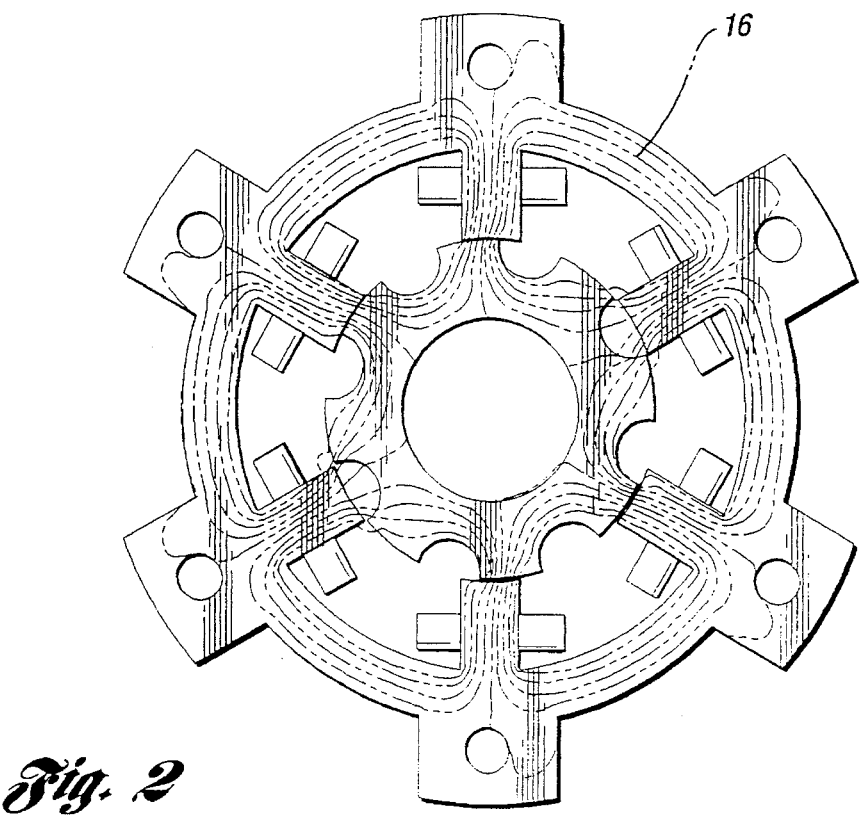
FIG. 2 is a schematic diagram of the inductance sensor of FIG. 1 illustrating the flux lines of the preferred arrangement under normal operating conditions.

With reference to FIG. 2, each of the stator salient poles 14a–14f is shown having a multi-turn winding around it. In accordance with the invention, the windings are electrically connected and powered in such a fashion that the magnetic flux path 16 closes around any two adjacent stator poles.

Significantly, the inductance sensor 10 of the present invention could closely resemble the structure of the variable reluctance or stepper motor to control. Such resemblance, however, is not required. In the preferred embodiment, the winding connection arrangement is three-phased windings distributed in six windings with two coils connected in series in each phase. The self-inductance of each phase is related with the rotor position. The phase self-inductance varies between a maximum crest shown at 18 of FIG. 3 when a rotor salient pole 12 is aligned with the stator coils, and a minimum valley 20 obtained when the rotor salient pole is not under the particular phase of the stator coil. The mutual inductance between phases is also dependent on the rotor position.

Figure 3:
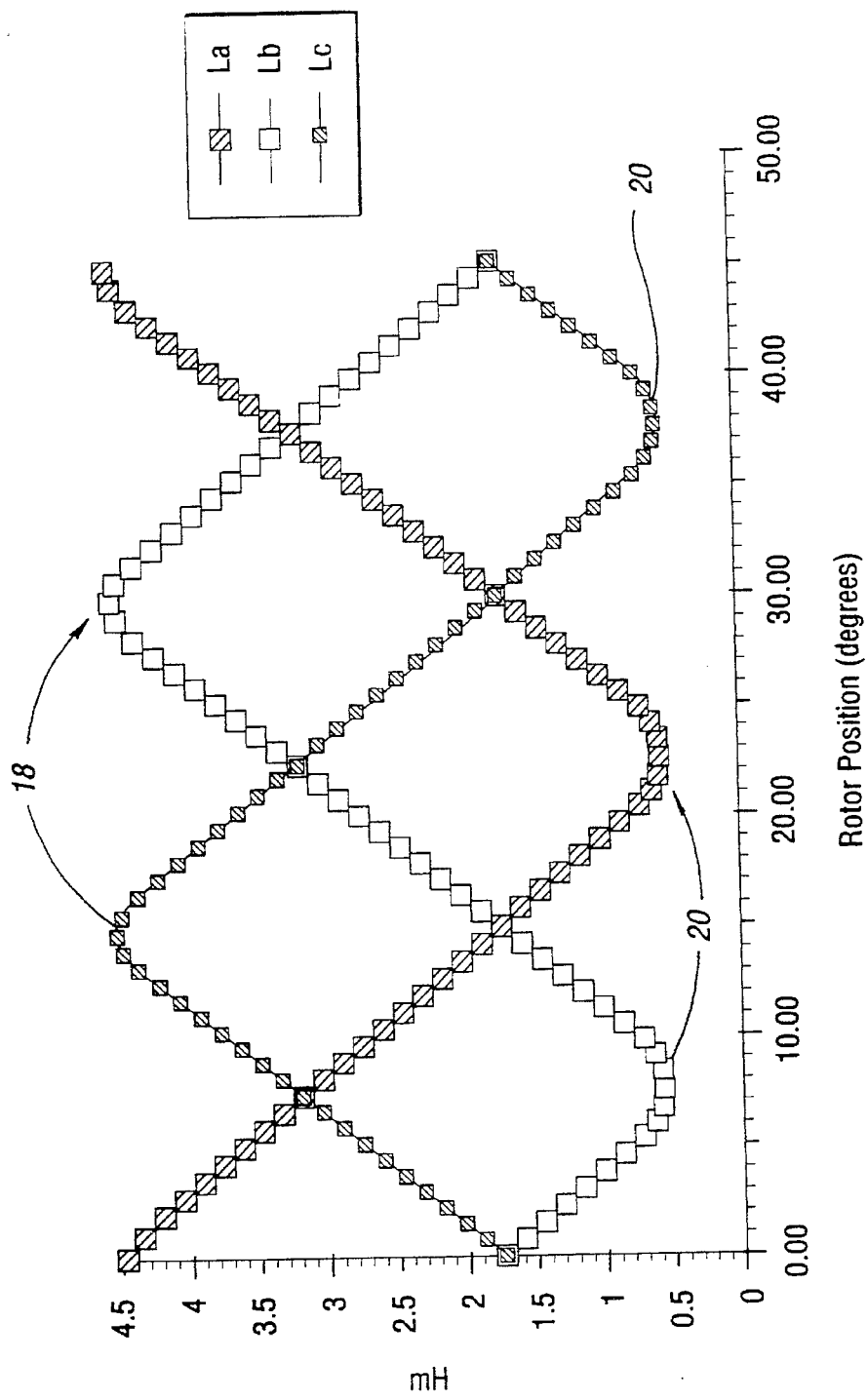
FIG. 3 is a schematic diagram illustrating an optimum phase inductance profile as a function of rotor position.

In keeping with the invention, applicants recognize that highly magnetic permeable materials in the rotor and stator cores will render larger values of the inductances. The width of the valleys 20 and crests 18 in the inductance versus rotor position profile can, therefore, be controlled by adjusting the width and shape of the salient poles in the rotor 12 and stator 14. The optimum salient pole width combination for the rotor and stator poles provides the maximum inductance variation between crests 18 and valleys 20 as shown in FIG. 3. The optimum also produces crests and valleys of width close to zero in a linear variation of the inductance profile L versus the rotor position in the region where the self-inductance of two adjacent phases has the same value.

To reduce the dependence and the effects of the mutual inductances between phases and to reduce the stator magnetization current, all windings in all phases are powered simultaneously, so the effects of mutual coupling between the phases are balanced out. In this manner, the magnetic path is also the shortest as shown in FIG. 2—given the smallest stator currents.

In accordance with the invention, it is desirable to obtain the larger possible value of the variable inductance. This can be obtained by increasing the number of turns in the stator coils, or by using highly permeable materials or, still further, by increasing the cross-sectional area of the poles or, yet still further, by using the combination of all of the above approaches. Of course, the obvious limitations of size, manufacturing and cost will set the limits of these variables.

As those skilled in the art will recognize, the rotor pole pitch is defined as the width of a salient rotor pole plus the interpole space. In accordance with the present invention, then, optimal rotor pole width is in the range of 0.42 to 0.52 times the rotor pole pitch. The optimal stator pole width is 0.96 to 1.04 times the width of the rotor poles.

In order to obtain the maximum inductance values and to ensure linear variation of the inductance between the crest and valley values, magnetic saturation must be avoided. As a result, the number of turns in the winding, the voltage applied to it, and the interval of time while they remain energized should be sized such that the currents do not saturate any part of the magnetic rotor and stator magnetic cores.

The magnetic saturation level may be determined in a first approximation from the relationship:

$$\mu*N*I=g*B$$

where N is the number of turns in each coil; I is the current through it; g is the air gap length, $\mu$ is the magnetic permeability of the vacuum; and B is the magnetic field density. B in the previous relationship should not be larger than one-third of the saturation value for any of the magnetic materials involved, when the current I is maximum. In keeping with the invention, the winding current is also related with the DC voltage $V_{dc}$ applied to it by the formula:

$$I*L=V_{dc}*\Delta t,$$

where L is the phase inductance and $\Delta t$ is the time interval while the current is applied.

Attention is directed to the fact that the phase inductance of the winding for each rotor position is computed from the above equation when all phases are energized. To do this, a known value of voltage $V_{dc}$ is applied and the current in each phase is monitored. When the phase current "I" reaches a preset value, the time interval $\Delta t$ is measured. At this point, the phase inductance is proportional to the measured time interval. When the phase inductance and all phases has been measured, the applied voltage is removed. Knowledge of the phase inductances and of the relationships with the rotor position as shown in FIG. 3 above, allows the computation of the rotor position within a rotor pole pitch.

Figure 4:
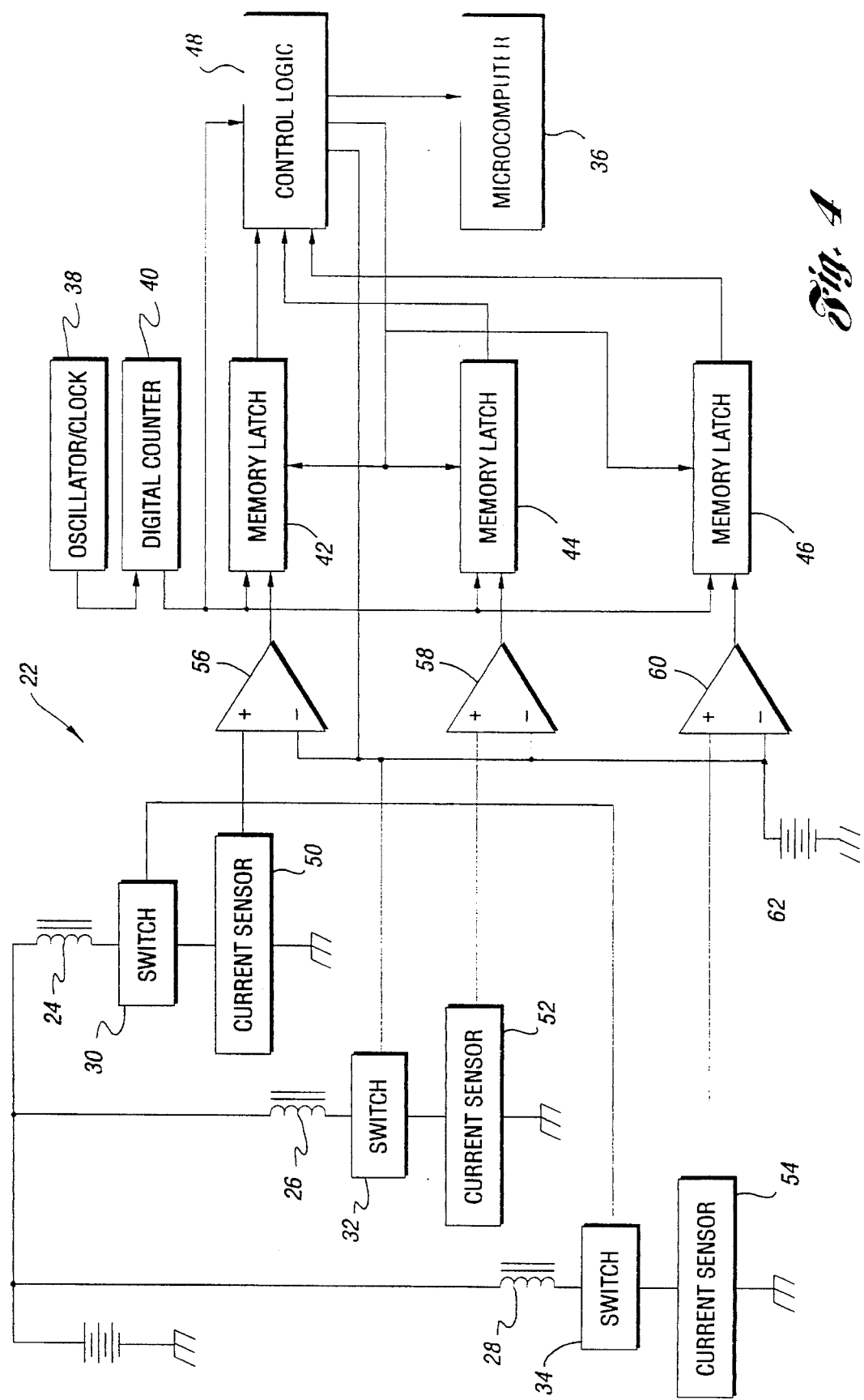
FIG. 4 is a schematic circuit diagram of the excitation circuit of the present invention.

Turning now to FIG. 4 of the drawings, the excitation electronics used to convert the changing encoder inductance to digital values which are suitable for computer processing is described in further detail. The excitation electronics are identified generally by reference numeral 22 and include a plurality of powered encoder coils 24, 26 and 28, each corresponding to a different phase. Encoder coils 24, 26 and 28 are each provided in electrical communication with a switch 30, 32, 34, which in the preferred embodiment, is a power Mosfet. Switches 30, 32 and 34 are also provided in electrical communication with one another and with microcomputer 36 which contains memory.

As also shown, there is provided a free-running oscillator/clock 38 which is electrically connected to a digital counter 40. Counter 40 is electrically connected to a plurality of memory latches 42, 44 and 46 and is further provided in electrical communication with microcomputer 36 (which includes memory) through control logic 48. A plurality of current sensors 50, 52 and 54, which, in the preferred embodiment, are simple resistors, are operative to convert the switch to current from their corresponding encoder coils to a corresponding voltage level. This voltage is provided as one input to a corresponding comparator 56, 58, 60 with a second input coming from a predetermined reference voltage source 62.

As explained in further detail herein, memory latches 42, 44 and 46 are operative to latch the value of digital counter 40 when the voltage inputs at comparators 56, 58 and 60 from their corresponding current sensors 50, 52 and 54 exceed the reference voltage provided by the reference voltage source 62. Stated more simply, the outputs from the comparators 56, 58 and 60 signal when the current in the respective variable reluctance coils 24, 26 and 28 reach a predetermined level as set by the second input (the reference voltage source 62) to the comparators. The comparator outputs are used to latch the value of digital counter 40 into respective registers at the instant the individual sensed currents in the variable reluctance encoder coils 24, 26 and 28 reach the predetermined value.

A typical analog/digital (A/D) conversion cycle proceeds as follows:

| | |
|---|---|
| t = 0 | The counter value is recorded or predetermined when the switches are turned on. |
| t > 0 | The currents in the variable reluctance coils are increasing and the value of digital counter 40 is increasing according to the time base oscillator 38. |
| t = latch event | The currents reach the predetermined level causing the comparators to signal that the respective coil currents have exceeded the reference value. The comparator signals cause the control logic 48 to save the counter values in their respective latched registers. |
| t > latch event | The switches are turned off after all coil currents reach the reference value. Also, at this time, the microcomputer 36 is interrupted to signal the completion of the A/D conversion. Sufficient time is allowed for the comparators to reset, the coil currents to decay to zero, and the latched registers are unloaded by the microcomputer 36 before starting another cycle. |

Subsequent A/D conversions are performed by repeatedly executing the above cycle. Significantly, since the rate of change of current is affected by the value of the variable reluctance phase inductance, then the true inductance of the phase is proportional to the time required to reach a predetermined level of current. The advantages of this A/D method of conversion is that the bulk of the circuits may be implemented at low cost digital circuit with the obvious exceptions of the current sensors and the comparators.

Figure 5:
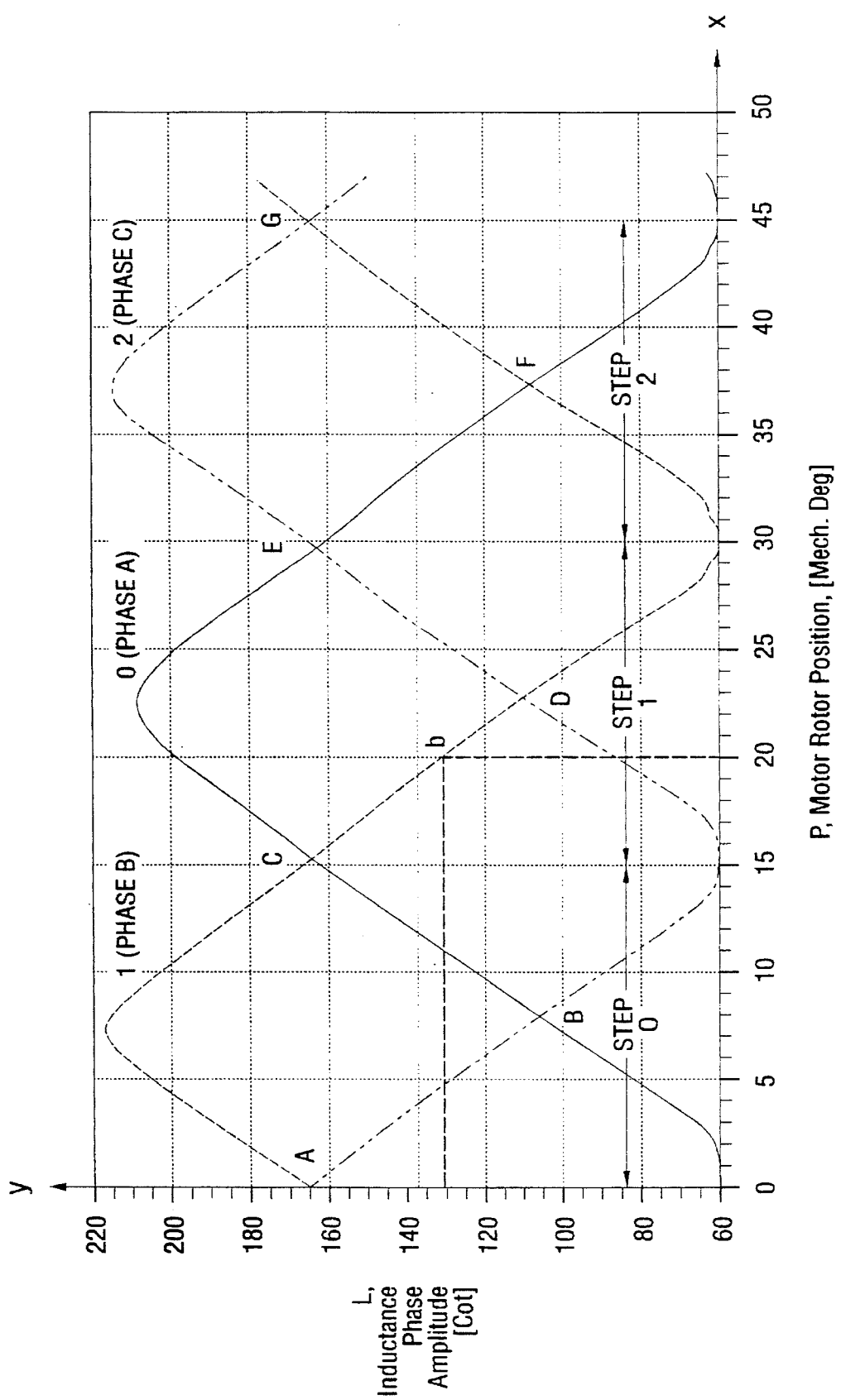
FIG. 5 is a schematic diagram of a representative inductance/position profile obtained with the present invention.
Figure 6:
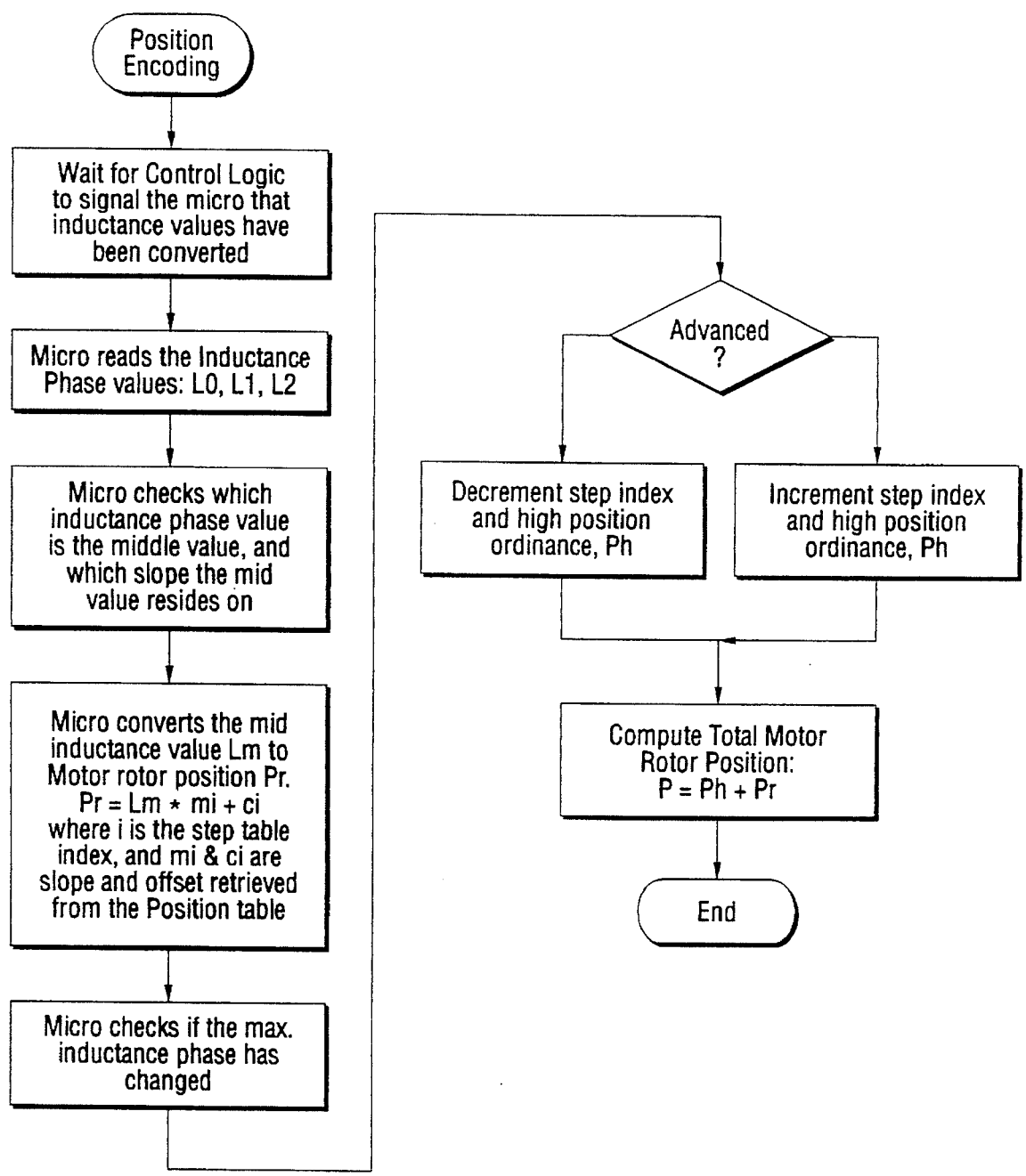
FIG. 6 is a logic diagram of the method of the present invention.
Figure 7:
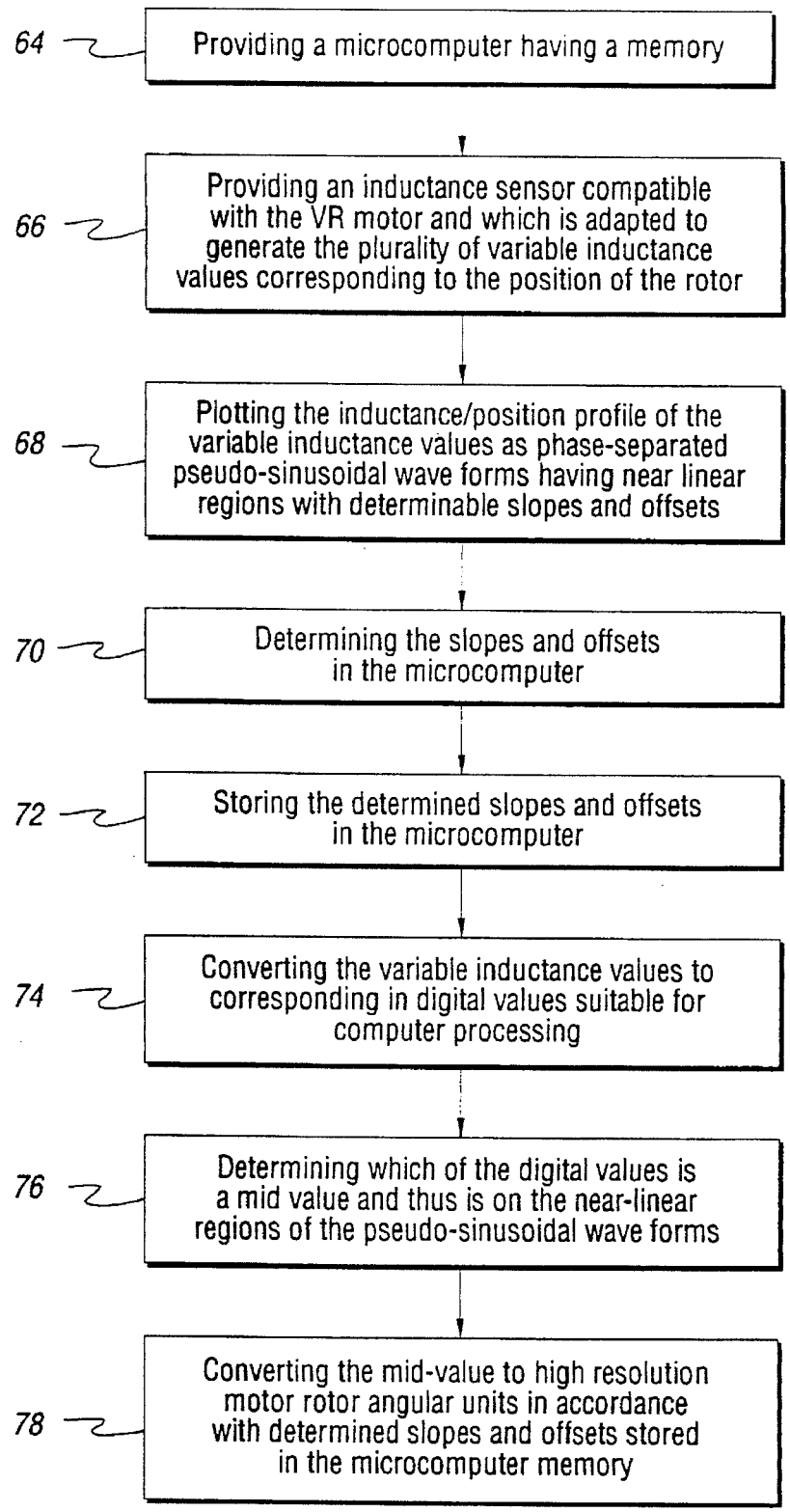
FIG. 7 is a generalized block diagram of the method steps of the present invention.

Turning now to FIGS. 5 and 6 of the drawings, the steps of converting the digital values obtained from the excitation electronics to high resolution motor rotor angular units will be described in further detail. As shown, the inductance values of FIG. 4 consist of three pseudo-sinusoidal waveforms for phases A, B and C, derived from inductance sensor 10. To achieve very high resolution and to increase the computation efficiency, only the near-linear, i.e., sawtooth, regions are used. Thus, line sections A-B, B-C, etc., are linearized into slopes (mi) and offsets (ci) during a calibration process and are stored into tables in the microcomputer's memory. The motor rotor angular units, PR within a step, is computed as:

$$PR=mi*Lm+ci$$

where Lm is the mid-value of the three inductance values. Each phase is assigned a value of 0, 1 and 2 representing phases A, B and C, respectively. The Y axis defined by points A to B to C is considered as a step (i) which is also used as the table index. In the sensor disclosed, 15° of mechanical rotation is equivalent to a step. Thus, when the rotor moves through points A, B and C to sections C-D, the step and high position of ordinance value Ph are incremented. Similarly, when the rotor moves the other way, the step and the high position ordinance value are decremented. The total rotor position, P, is made up of the high ordinance value Ph and the low ordinance value Pr. FIG. 6 provides a flowchart of how the position encoding is implemented in accordance with the present invention. FIG. 7 similarly illustrates a block diagram of the specific encoding steps of the method of the present invention.

As indicated above, the method is directed for use with a Variable Reluctance motor and is used to determine absolute rotor position. The method includes the provision 64 of a microcomputer having memory along with the provision 66 of an inductance sensor compatible with the VR motor and which is adapted to generate a plurality of variable inductance values corresponding to the position of the rotor. The method further includes plotting 68 the inductance/position profile of the variable inductance values as phase-separated pseudo-sinusoidal waveforms having near linear, i.e., sawtooth, regions with determinable slopes and offsets. The slopes and offsets of these near linear regions are thereafter determined 70 and stored 72 in the microcomputer memory. Thereafter, the variable inductance values are converted 74 to corresponding digital values suitable for computer processing. Finally, it is determined 76 which of the digital values is a mid-value and thus is on the near linear regions of the pseudo-sinusoidal waveforms. The mid-value is thereafter converted 78 to high resolution motor rotor angular units in accordance with the determined slopes and offsets stored in the microcomputer memory.

With reference to the sinusoidal waveforms, flow diagram and block diagram of the method steps of the present invention shown in FIGS. 5, 6 and 7, respectively, a set of inductance values (a, b, c) may be read by the microcomputer. Value b is found to be the mid-value of the set, and the step index i=1, the high position ordinance value Ph=1. The low ordinance position value thus becomes Pr=m1*b+c1, where m1 and c1 are obtained through reference to the table inside the microcomputer. Once this information has been compiled, the total rotor position may be determined which as shown in FIG. 5, yields 20 mechanical degrees.

While the best mode for carrying out the present invention has been described in detail, those familiar with the art to which this invention relates will recognize various alternative designs and embodiments for practicing the invention as defined by the following claims.

What is claimed is:

1. An angular encoder system for determining absolute angular position of a rotor, the system comprising:

an inductance sensor adapted to generate a plurality of variable inductance values corresponding to the position of the rotor, said inductance values including mid values having near linear regions with determinable slopes and offsets;

excitation electronics in electrical communication with said inductance sensor for generating digital values of said inductance values corresponding to the angular position of the rotor; and a microcomputer having memory storing calibration data corresponding to said variable inductance values in electrical communication with said excitation electronics, said microcomputer responsive to said mid values and said calibration data to generate an output signal having a value corresponding to the angular position of the rotor.

2. An angular encoder system as in claim 1, wherein said inductance sensor comprises:

a stationary arrangement of stationary coils which form a stator; and a magnetic salient pole rotating structure which forms a rotor and is free to turn inside or outside of said stator.

3. An angular encoder system as in claim 2, wherein said stator has 6 salient poles, each of said poles having a multi-turn winding around it.

4. An angular encoder system as in claim 2, wherein said rotor has 8 salient poles.

5. An angular encoder system as in claim 2, wherein said stator has a plurality of salient poles, each of said stator poles electrically connected and powered such that a magnetic flux path closes around any two adjacent stator poles.

6. An angular encoder system as in claim 3, wherein said stator poles are arranged in three-phased windings distributed in 6 windings with 2 coils connected in series in each phase.

7. An angular encoder system as in claim 1, wherein said inductance sensor is adapted to generate 3 phase-separated variable inductance values for each rotor position.

8. An angular encoder system as in claim 1, wherein said excitation electronics comprises:

a plurality of powered encoder coils;

a plurality of switches, each of said switches in electrical communication with one another and a corresponding encoder coil;

a plurality of current sensors, each of said sensors in electrical communication with a corresponding switch and adapted to convert current to voltage;

a free running oscillator/clock;

a digital counter in electrical communication with said oscillator/clock, and said microcomputer;

a plurality of comparators, each of said comparators having a first input from a corresponding current sensor, a second input from a reference voltage source, and an output; and a plurality of memory latches, each of said memory latches in electrical communication with one another, said digital counter, said microcomputer, and the output of a corresponding comparator, said memory latches each operative to latch the value of said digital counter when the voltage input from a corresponding current sensor exceeds the reference voltage at the corresponding comparator.

9. A method for determining absolute angular position of a rotor, the method comprising:

generating at an inductance sensor a plurality of variable inductance values corresponding to the position of the rotor, the inductance values including mid values having near linear regions with determinable slopes and offsets;

generating digital values of said inductance values corresponding to the angular position of the rotor;

storing in a microcomputer having memory calibration data corresponding to said variable inductance values; and generating at said microcomputer an output signal responsive to said mid values and said calibration data, said output signal having a value corresponding to the angular position of the rotor.

10. A method for determining absolute angular position of a rotor as in claim 9, further including the step of converting said digital values to high resolution motor rotor units.

11. A method for determining absolute angular position of a rotor as in claim 9, wherein said step of converting said digital values to high resolution motor rotor units is accomplished in accordance with the formula:

$$Pr=mi*Lm+ci,$$

where:

$mi$=slope;

$c_i$=offset;

$L_m$=the mid value of the plotted inductance values;

P=total rotor position=Ph+Pr;

Ph=high ordinance position value; and

Pr=low ordinance position value.

12. A method for determining absolute angular position of a rotor, the method comprising:

connecting an inductance sensor to the rotor, said inductance sensor generating phase separate pseudo-sinusoidal waveforms having near linear regions for mid values between a maximum value and a minimum value;

exciting said inductance sensor to generate said phase-separated pseudo-sinusoidal waveforms, at least one of said waveforms having said mid values;

storing calibration data for said inductance sensor in a memory of a computer, said calibration data including the slopes of said near linear regions and offsets for each of said waveforms; and generating with said computer a signal having a value indicative of the angular position of the rotor, in response to said at least one mid value and said calibration data.

* * * * *